US012607344B1

(12) United States Patent
Lin

(10) Patent No.: US 12,607,344 B1
(45) Date of Patent: Apr. 21, 2026

(54) INTERACTIVE JOYSTICK STRUCTURE COMBINED WITH LIGHT-EMITTING MODULE

(71) Applicant: FA TENG TECHNOLOGY CO., LTD., Taichung City (TW)

(72) Inventor: Shau-Yu Lin, Taichung City (TW)

(73) Assignee: FA TENG TECHNOLOGY CO., LTD., Taichung City (TW)

( * ) Notice: Subject to any disclaimer, the term of this patent is extended or adjusted under 35 U.S.C. 154(b) by 0 days.

(21) Appl. No.: 19/235,601

(22) Filed: Jun. 12, 2025

(51) Int. Cl.
| | |
|---|---|
| *F21V 33/00* | (2006.01) |
| *F21V 15/01* | (2006.01) |
| *F21V 17/12* | (2006.01) |
| *F21V 23/00* | (2015.01) |
| *F21Y 115/10* | (2016.01) |
| *G06F 3/0338* | (2013.01) |

(52) U.S. Cl.
CPC ............ *F21V 33/008* (2013.01); *F21V 15/01* (2013.01); *F21V 17/12* (2013.01); *F21V 23/001* (2013.01); *G06F 3/0338* (2013.01); *F21Y 2115/10* (2016.08)

(58) Field of Classification Search
CPC ........ G06F 3/0338; F21V 15/01; F21V 17/12; F21V 23/001; F21V 33/008; F21Y 2115/10
See application file for complete search history.

(56) References Cited

U.S. PATENT DOCUMENTS

2021/0308565 A1* 10/2021 Li ............................ A63F 13/24
2025/0153037 A1* 5/2025 Tu ......................... H05K 1/0274

FOREIGN PATENT DOCUMENTS

JP 3252508 U * 8/2025
TW M673740 U * 8/2025

OTHER PUBLICATIONS

Machine translation of JP-3252508-U (Year: 2025).*
Machine translation of TW-M673740-U (Year: 2025).*

* cited by examiner

*Primary Examiner* — Michael Pervan
(74) *Attorney, Agent, or Firm* — Che-Yang Chen

(57) ABSTRACT

An interactive joystick structure combined with a light-emitting module is disclosed. The interactive joystick structure includes a transparent base, a plurality of light-emitting modules disposed on a circuit board, a transparent nut, and a joystick device. The interactive joystick structure not only enhances the operation function of the interactive joystick but also provides an attractive visual light-emitting effect, making it suitable for diverse applications such as game controllers, interactive display platforms, or next-generation human-machine interfaces.

6 Claims, 6 Drawing Sheets

INTERACTIVE JOYSTICK STRUCTURE COMBINED WITH LIGHT-EMITTING MODULE

BACKGROUND OF THE PRESENT INVENTION

Field of Invention

The present invention relates to an interactive joystick structure, and more particularly to an interactive joystick structure combined with a light-emitting module. Through the combination of a transparent structure and multiple light-emitting modules, in addition to the operation function of the joystick, the joystick has a visual light-emitting effect, making it suitable for diverse applications such as game controllers, human-machine interfaces, display devices or interactive platforms.

Description of Related Arts

Under the current trend of human-computer interaction, which increasingly emphasizes on somatosensory and visual integration, interactive joysticks, as the key control components of game controllers, display devices, virtual operating platforms and other devices, are highly valued for their structural design and feedback performances. In the prior art, a conventional joystick structure only focuses on the mechanical movement and direction control functions, and the improvement of the visual presentation or user interaction is relatively limited.

Although there are some light-emitting components, such as LED modules, used in joystick structures, most of them are arranged around the joystick. As disclosed in Taiwan Utility Model Publication No. M277054, a joystick directional control device comprises a light-blocking element mounted on the joystick and four optical modules. The four optical modules are arranged around the light-blocking element with the joystick as the center and evenly spaced in terms of angular distance. The four optical modules each have a light transmitter and a light receiver, thereby forming a means to sense the control direction of the joystick by means of light transmission and reception, which can effectively solve various shortcomings of the mechanical structure in use. However, this conventional structure cannot be effectively integrated with the main body of the joystick to guide the light, and the assembly is complicated and the light distribution is uneven, so it cannot achieve a good integrated visual effect. In addition, the prior art lacks an interactive joystick that can be assembled in a modular manner and has structural stability and light-guiding function.

Therefore, it is necessary to provide an interactive joystick structure combined with a light-emitting module to solve the problems faced by the conventional joystick devices in terms of structural integration, uniformity of light emission, and ease of operation.

SUMMARY OF THE PRESENT INVENTION

The primary object of the present invention is to provide an interactive joystick structure combined with a light-emitting module. Through the ingenious combination of a transparent structure and multiple light-emitting modules, a joystick device can directly guide the light emitted by the light-emitting modules, thereby creating a luminous interactive experience with high consistency and good visual effects.

In order to achieve the foregoing object, the interactive joystick structure provided by the present invention comprises a transparent base, a circuit board, a transparent nut, and a joystick device. The transparent base has a transparent support surface on a top thereof, a transparent post extending upwardly from a center of the transparent support surface, and an external thread portion on the transparent post. The circuit board has a through hole corresponding in position to the transparent post. The circuit board includes a plurality of light-emitting modules around a periphery of the through hole. The light-emitting modules each have a light-emitting portion that is oriented toward a center of the through hole. The transparent nut has an internal thread portion on an inner wall thereof. The transparent nut is screwed on the transparent post to tighten the circuit board. The joystick device is inserted through the transparent nut and the circuit board in a top-down direction and connected to the transparent base.

In one embodiment, the joystick device includes a support rod therein. The end of the support rod is connected to a universal ball joint. A dust cover is provided between the joystick device and the universal ball joint to prevent foreign matter from interfering with the flexibility. The joystick device is made of transparent acrylic material, such that the light from the light-emitting modules can be guided, refracted and extended to the joystick, creating an overall luminous effect. The light-emitting modules are composed of light-emitting diodes, providing a long-lasting and stable light source.

By combining a transparent structure and multiple light-emitting modules, the present invention achieves a high degree of visual and structural integration of the overall joystick, which can be easily assembled and disassembled and is suitable for a variety of devices with interactive, display, or entertaining needs.

DETAILED DESCRIPTION OF THE PREFERRED EMBODIMENT

Figure 1:
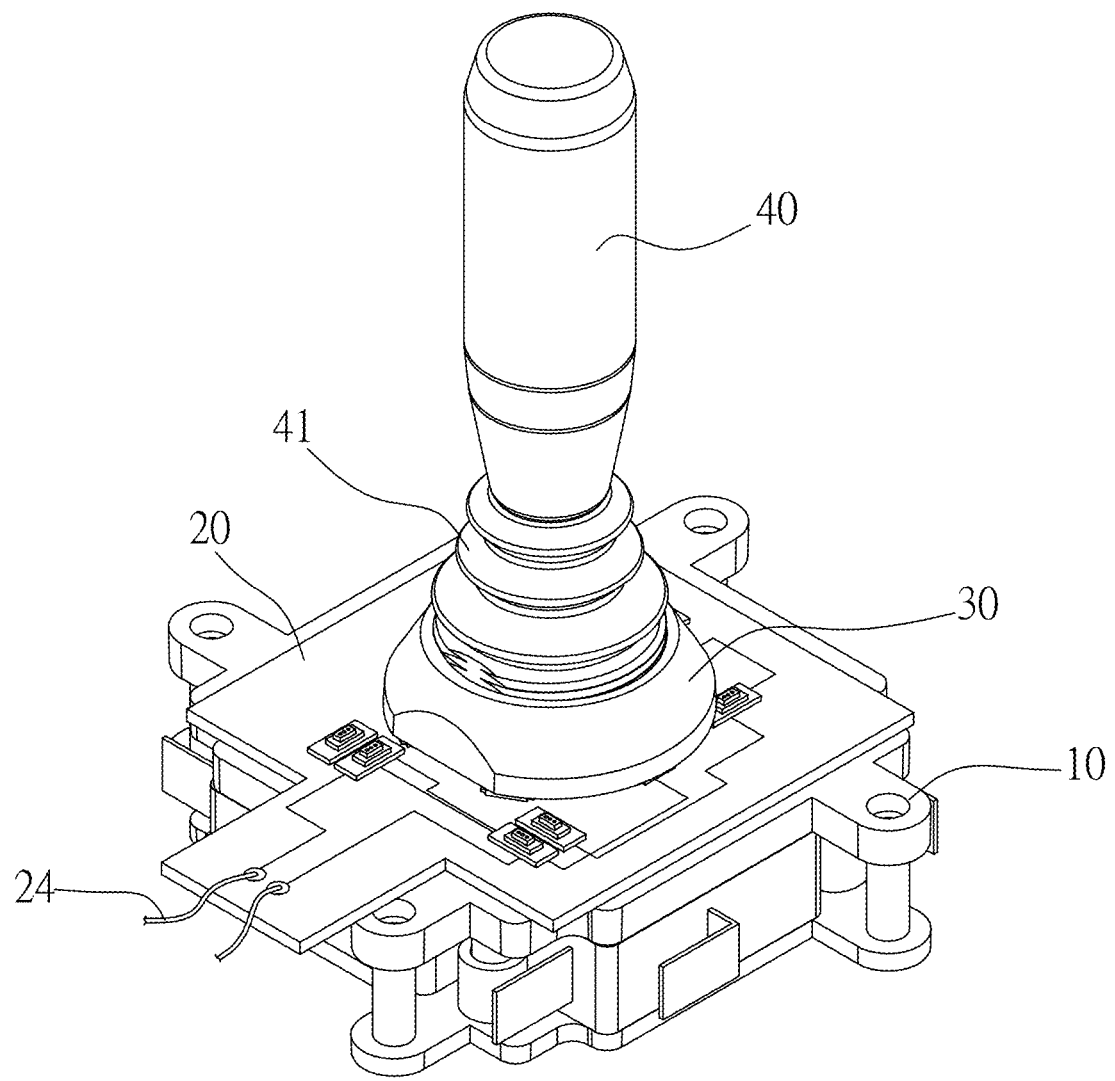
FIG. 1 is a perspective view of the present invention.

Embodiments of the present invention will now be described, by way of example only, with reference to the accompanying drawings.

Referring to FIG. 1 through FIG. 6, the present invention discloses an interactive joystick structure combined with a light-emitting module. The interactive joystick structure comprises a transparent base 10, a circuit board 20, a transparent nut 30, and a joystick device 40.

The transparent base 10 has a transparent support surface 11 on the top of the transparent base 10, a transparent post 12 extending upwardly from the center of the transparent support surface 11, an external thread portion 13 on the outer wall of the transparent post 12, and a mounting space 14 defined inside the transparent post 12 for mounting the joystick device 40.

Figure 2:
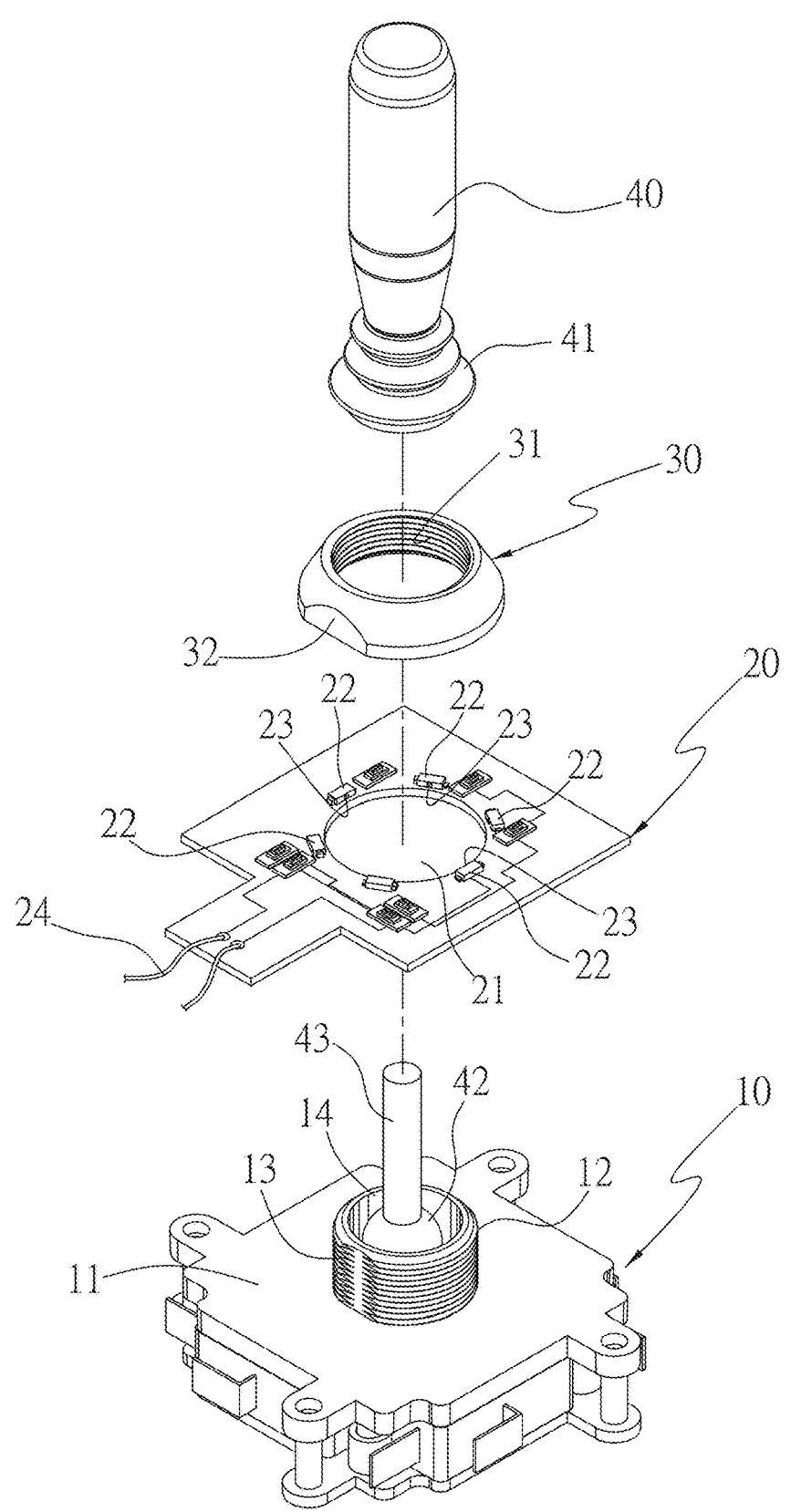
FIG. 2 is an exploded view of the present invention.
Figure 3:
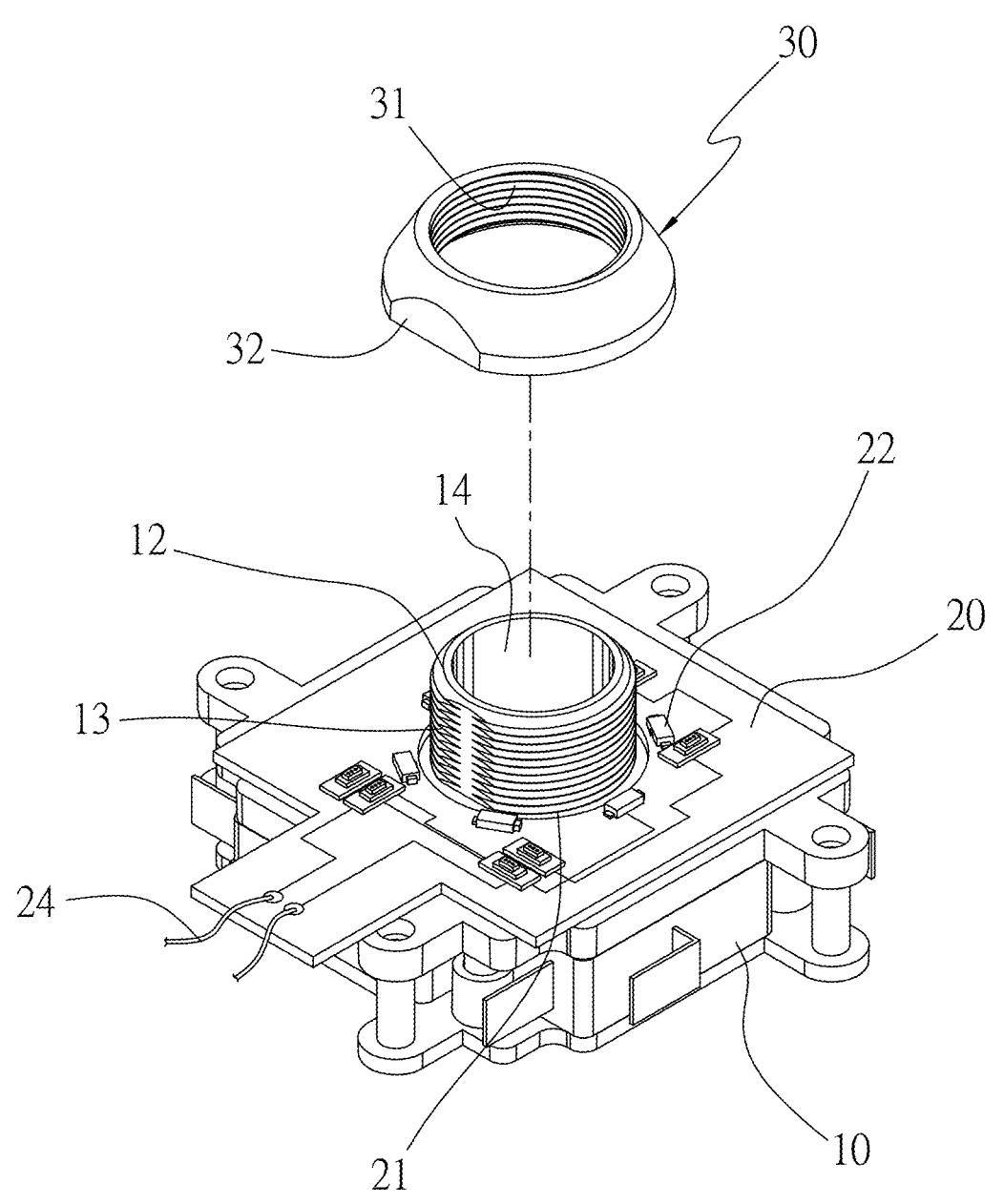
FIG. 3 is an exploded view of the transparent nut and the transparent base combined with the circuit board of the present invention.
Figure 6:
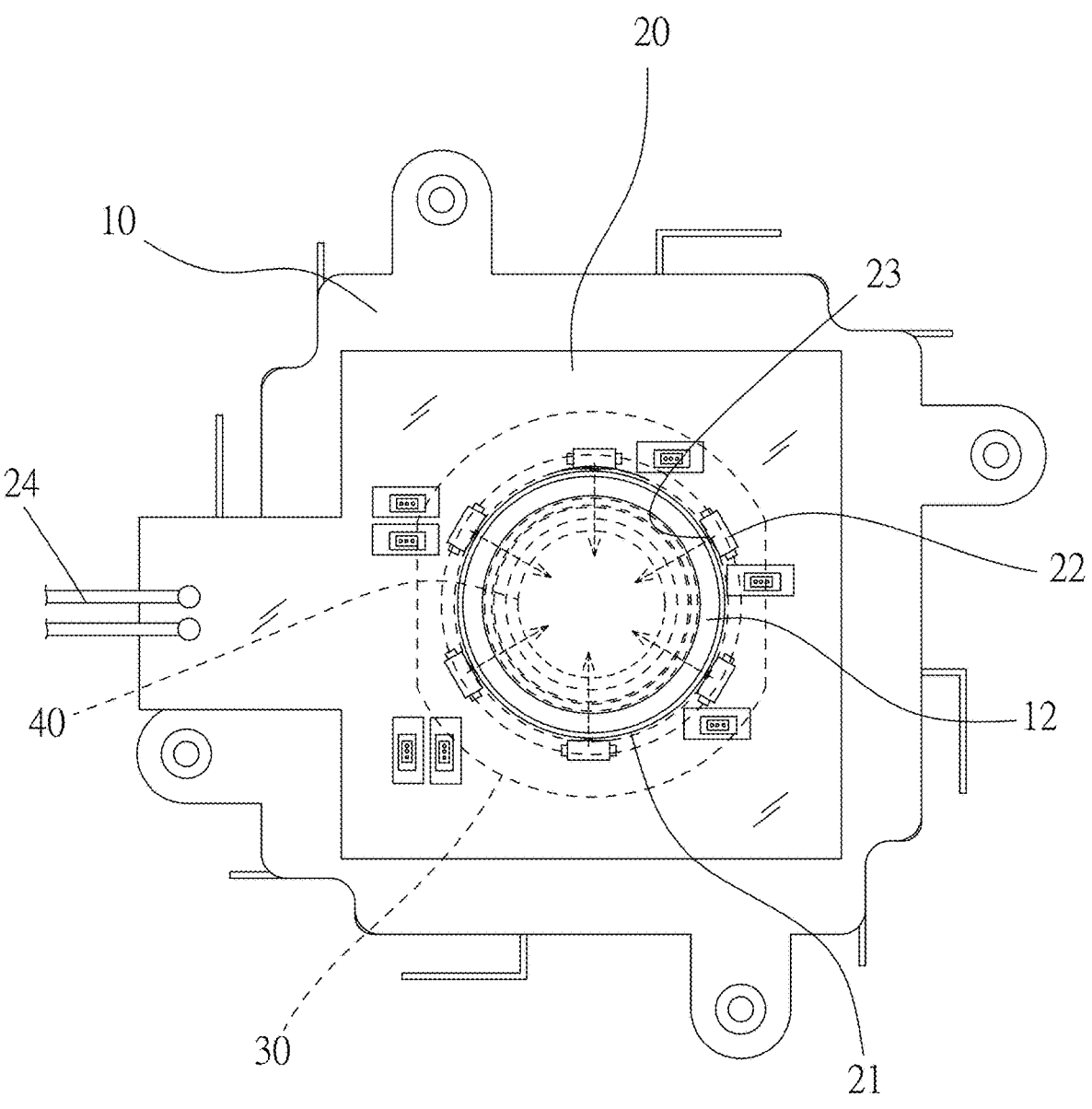
FIG. 6 is a top view of the present invention.

Referring to FIG. 2 and FIG. 3, the circuit board 20 has a through hole 21 corresponding in position to the transparent post 12. The circuit board 20 is fitted onto the transparent post 12 through the through hole 21 and is attached to the transparent support surface 11. The circuit board 20 includes a plurality of light-emitting modules 22 around the periphery of the through hole 21. The light-emitting modules 22 correspond in position to the circumferential wall of the transparent post 12. Each of the light-emitting modules 22 has a light-emitting portion 23. As shown in FIG. 6, the light-emitting portion 23 is oriented toward the center of the through hole 21, such that the light emitted by the light-emitting portion 23 can be concentrated and directed toward the transparent post 12 and the transparent nut 30, thereby producing a visual light-emitting effect.

The inner wall of the transparent nut 30 has an internal thread portion 31 corresponding to the external thread portion 13 of the transparent post 12. When the transparent nut 30 is screwed downward, the internal thread portion 31 of the transparent nut 30 is engaged with the external thread portion 13 of the transparent post 12, thereby tightening the circuit board 20 on the transparent support surface 11 of the transparent base 10. As shown in FIG. 1 and FIG. 2, the outer edge of the transparent nut 30 has at least two operation portions 32. The operation portions 32 are external configurations in the form of cut-out surfaces for the user to tighten or remove the transparent nut 30 manually.

Figure 4:
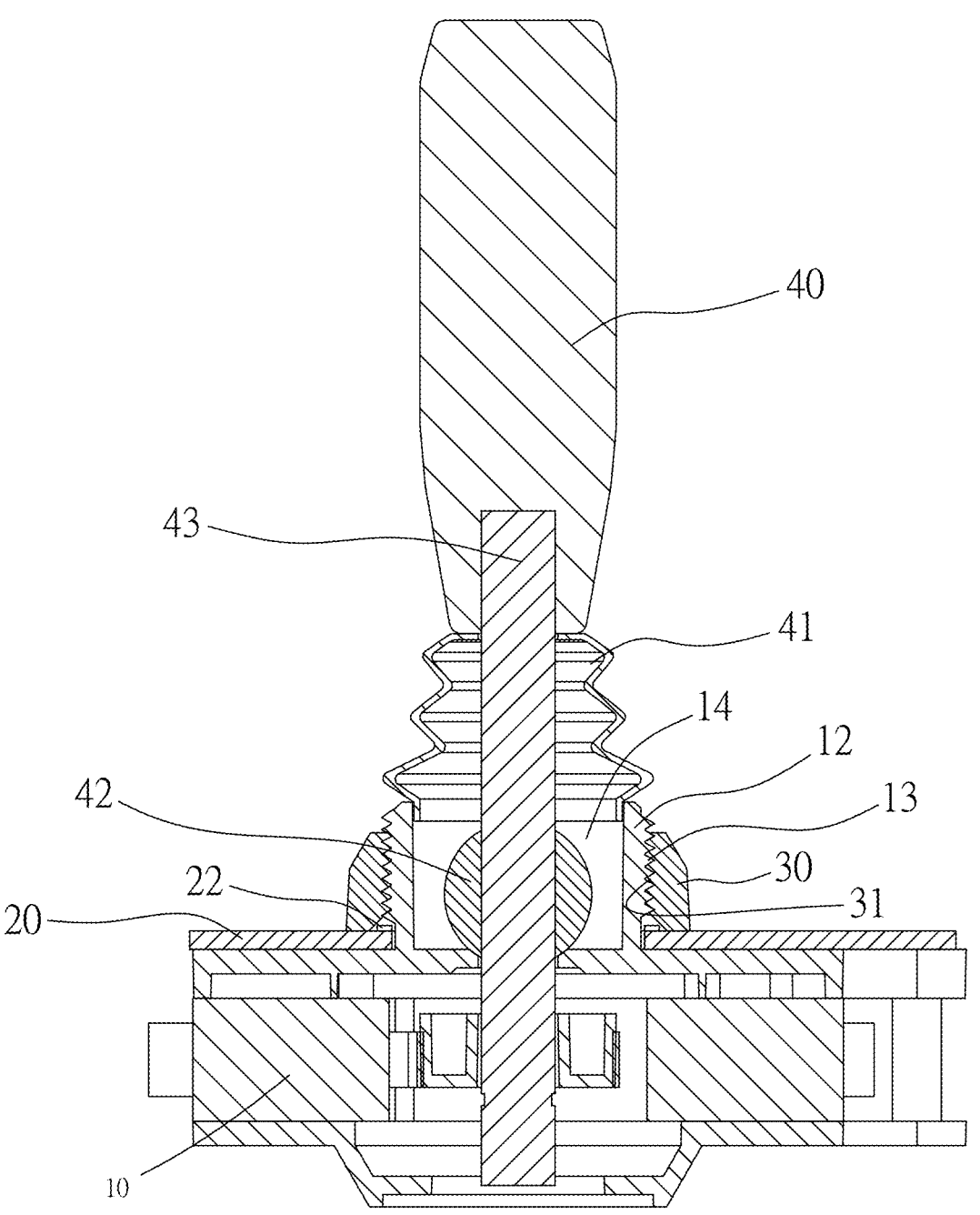
FIG. 4 is a cross-sectional view of the present invention.
Figure 5:
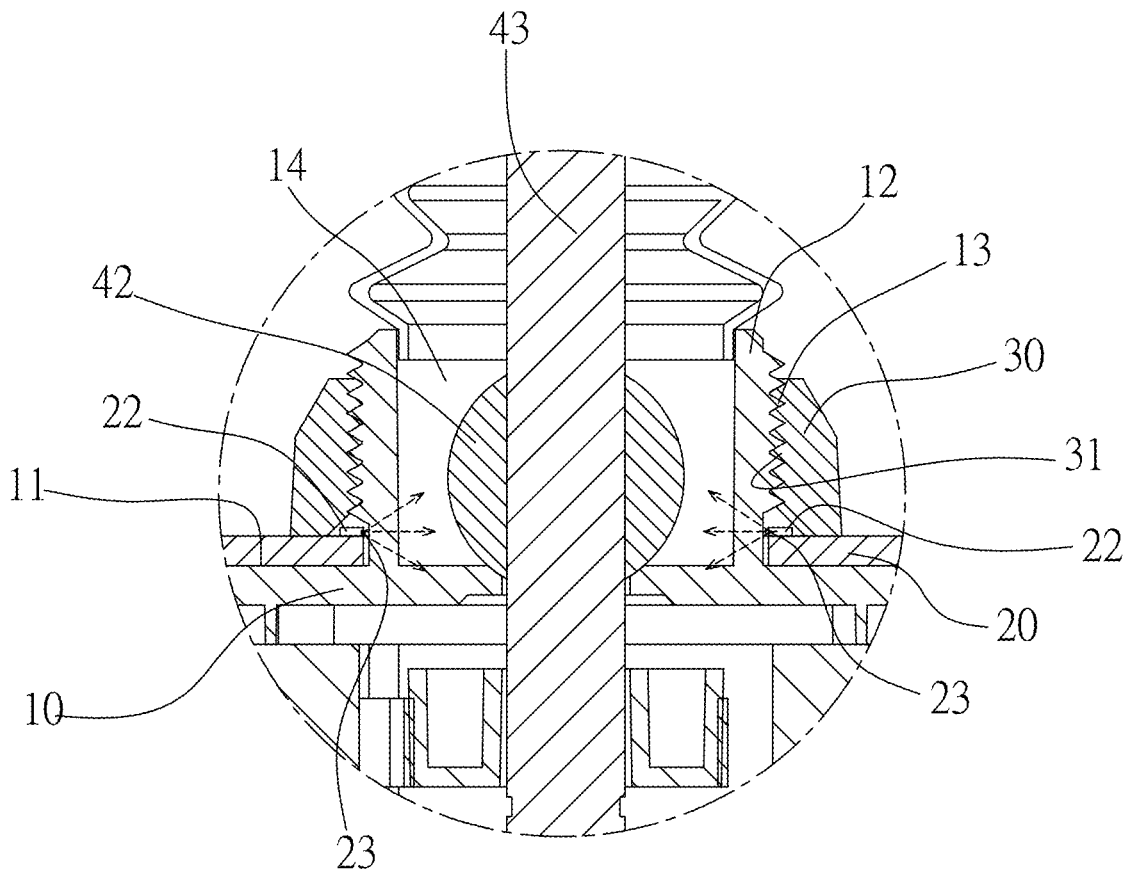
FIG. 5 is a partial, enlarged view of FIG. 4.

As shown in FIG. 4 and FIG. 5, the joystick device 40 is sequentially inserted through the transparent nut 30 and the through hole 21 of the circuit board 20 in a top-down direction and connected to the mounting space 14 of the transparent base 10.

In one embodiment, a support rod 43 is provided in the mounting space 14 of the transparent base 10. The support rod 43 is insertedly connected to a universal ball joint 42. The upper end of the support rod 43 is insertedly connected to the joystick device 40. The universal ball joint 42 is disposed in the mounting space 14, providing multi-directional operational flexibility. A dust cover 41 is provided between the joystick device 40 and the universal ball joint 42 to prevent dust or foreign objects from entering the mounting space 14 and jamming the mechanism, thereby improving the service life and operational stability.

As shown in FIG. 4, a plurality of electric wires 24 may be provided on one side of the circuit board 20 to supply power or signal output interfaces, such that the light-emitting modules 22 can be connected to an external control unit for adjustment of brightness, color, or flashing modes.

In one embodiment, the joystick device 40 may be made of transparent acrylic material. Thus, when the light-emitting module 22 emits light, the light emitted by the light-emitting portion 23 can be further refracted and transmitted to the joystick device 40 via the transparent post 12 and the transparent nut 30. Through the transparent light-guiding effect of acrylic, an overall luminous interactive visual feature is achieved.

Preferably, the light-emitting modules 22 may be composed of light-emitting diodes, which have the advantages of small size, stable illumination, long service life and power saving and are suitable for interactive device applications that require compact structures and needs to be used for a long period of time.

Thus, the present invention not only enhances the operation function of the interactive joystick but also provides an attractive visual light-emitting effect, making it suitable for diverse applications such as game controllers, interactive display platforms, or next-generation human-machine interfaces.

Although embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An interactive joystick structure, comprising:
a transparent base, having a transparent support surface on a top thereof, a transparent post extending upwardly from a center of the transparent support surface, a mounting space defined inside the transparent post, and an external thread portion on an outer wall of the transparent post;
a circuit board, having a through hole corresponding in position to the transparent post, the circuit board being fitted onto the transparent post through the through hole and attached to the transparent support surface, the circuit board including a plurality of light-emitting modules around a periphery of the through hole, the light-emitting modules corresponding in position to a circumferential wall of the transparent post, the light-emitting modules each having a light-emitting portion, the light-emitting portion being oriented toward a center of the through hole;
a transparent nut, having an internal thread portion on an inner wall thereof, wherein when the transparent nut is screwed downward, the internal thread portion of the transparent nut is engaged with the external thread portion of the transparent post, thereby tightening the periphery of the through hole of the circuit board;
a joystick device, inserted through the transparent nut and the through hole of the circuit board in a top-down direction and connected to the mounting space of the transparent base.

2. The interactive joystick structure as claimed in claim 1, wherein a support rod is provided in the mounting space, the support rod is insertedly connected to a universal ball joint, an upper end of the support rod is insertedly connected to the joystick device, the universal ball joint is disposed in the mounting space, and a dust cover is provided between the joystick device and the universal ball joint.

3. The interactive joystick structure as claimed in claim 1, wherein a plurality of electric wires are provided on one side of the circuit board.

4. The interactive joystick structure as claimed in claim 1, wherein an outer edge of the transparent nut has at least two operation portions in the form of cut-out surfaces.

5. The interactive joystick structure as claimed in claim 1, wherein the joystick device is made of transparent acrylic material.

6. The interactive joystick structure as claimed in claim 1, wherein the light-emitting modules are composed of light-emitting diodes.

* * * * *